Sept. 13, 1932.    H. FORD    1,876,903
AXLE
Filed Sept. 8, 1930    3 Sheets-Sheet 1

INVENTOR.
Henry Ford.
BY
ATTORNEY.

Witness.
E.C. McRae.

Sept. 13, 1932.    H. FORD    1,876,903
AXLE
Filed Sept. 8, 1930    3 Sheets-Sheet 2
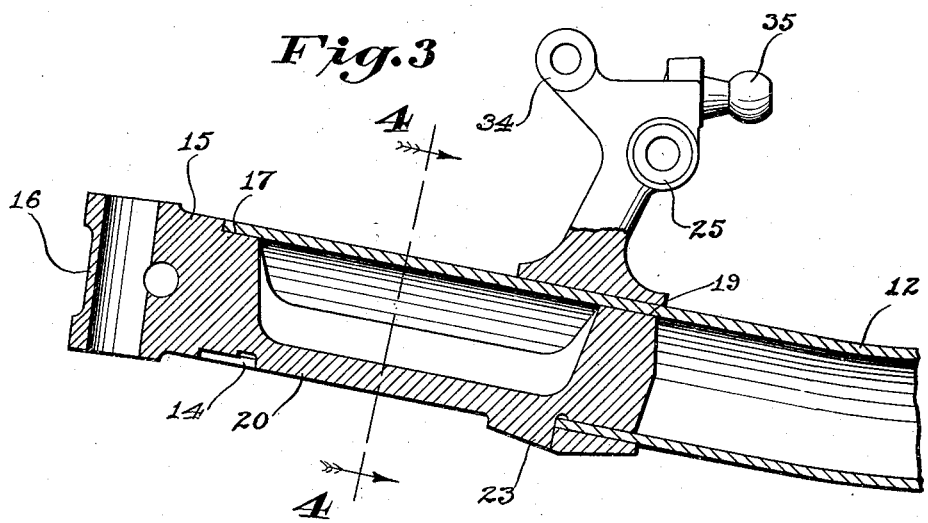
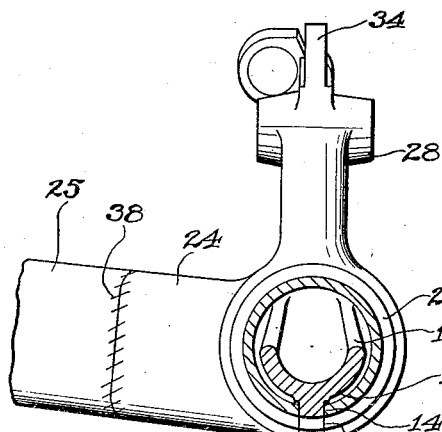
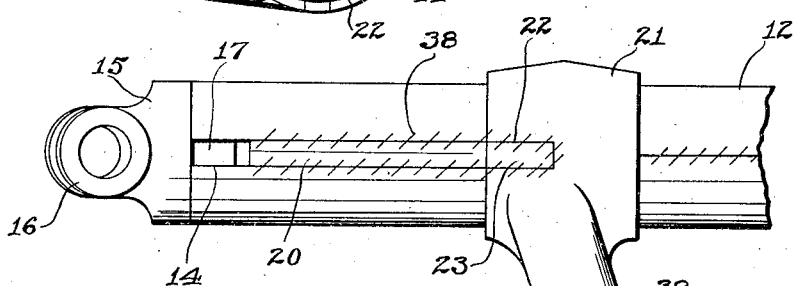
INVENTOR.
Henry Ford
BY
ATTORNEY.
Witness.
E. C. McRae.

Sept. 13, 1932. H. FORD 1,876,903
AXLE
Filed Sept. 8, 193 3 Sheets-Sheet 3
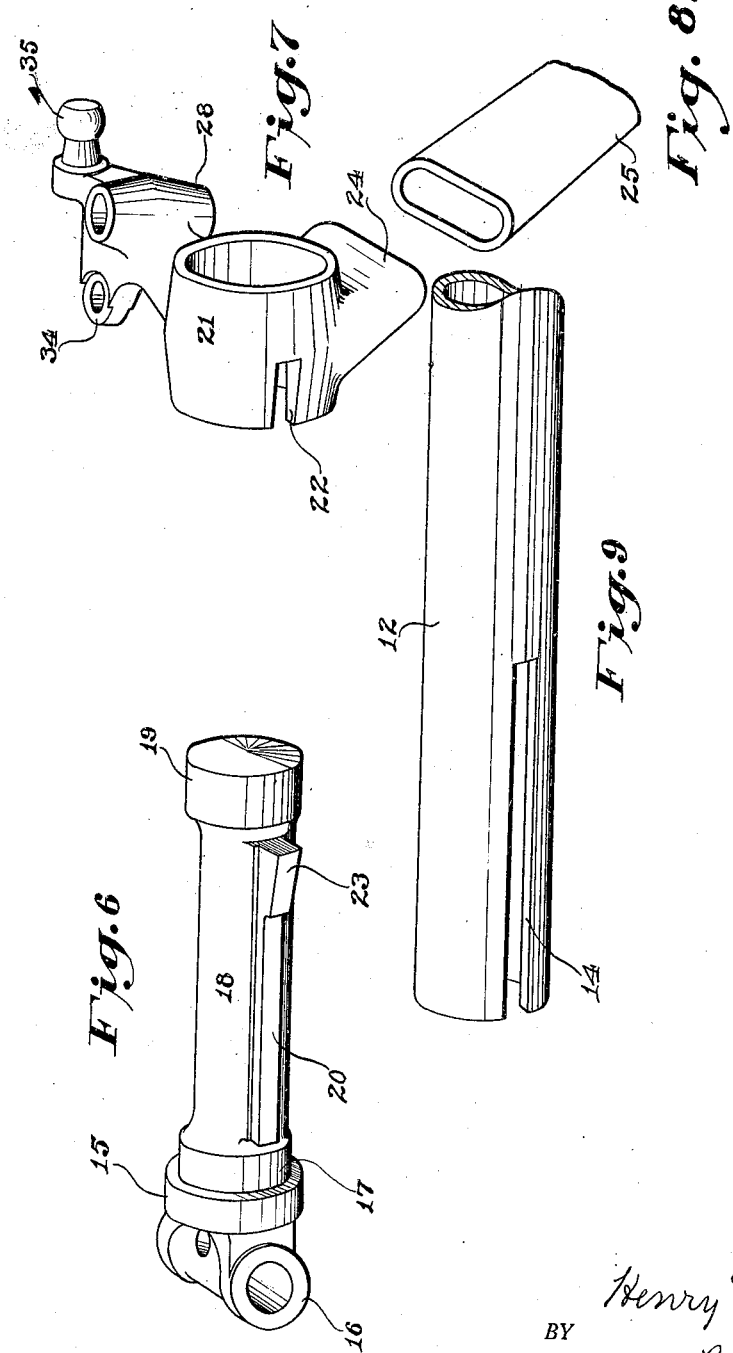

Patented Sept. 13, 1932

1,876,903

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

AXLE

Application filed September 8, 1930. Serial No. 480,447.

The object of my invention is to provide an axle especially adapted for use in supporting the front wheels of an automobile, which axle will be very strong, economical to manufacture, and exceptionally light in weight to thereby reduce the unsprung weight of the car. This reduction in axle weight not only lessens the cost of the car but improves its riding qualities to a great extent.

In the improved structure about to be described, means are provided whereby the torque loads of the front wheel brakes are transferred from the knuckle joints directly to the spring perches thereby relieving the tubular axle from the torque loads so that only a tube capable of supporting the car weight need be employed. The tubular section, although being welded into an integral unit with my knuckle joints, spring perches and radius rods, still is not subject to torsional strains so that the tube need be no heavier than that formerly used in cars not having front wheel brakes.

In the structure disclosed herein no rivets, clamps or the like are used, the brake torque being transmitted from the knuckles through an integral key which interlocks with the spring perches. Thus, I am able to provide an exceptionally strong and light front axle structure and one in which no bolts, rivets or the like contribute to its strength.

With these and other objects in view, my invention consists in the arrangement, construction, and combination of the various parts of my improved device, as described in the specification, claimed in my claims, and illustrated in the accompanying drawings, in which:

Figure 3 shows a central, vertical, sectional view through one outer end of my improved axle.

Figure 4 shows a sectional view taken on the line 4—4 of Figure 3.

Figure 5 shows a bottom view of one outer end of the axle illustrating the line welded portions of the axle.

Figure 6 shows a perspective view of one of the knuckle joints.

Figure 7 shows a perspective view of one of the radius rod sleeves and spring perch forgings.

Figure 8 shows a perspective view of a portion of a radius rod, and

Figure 9 shows a perspective view of the slotted end portions of the axle tube.

Figure 1:
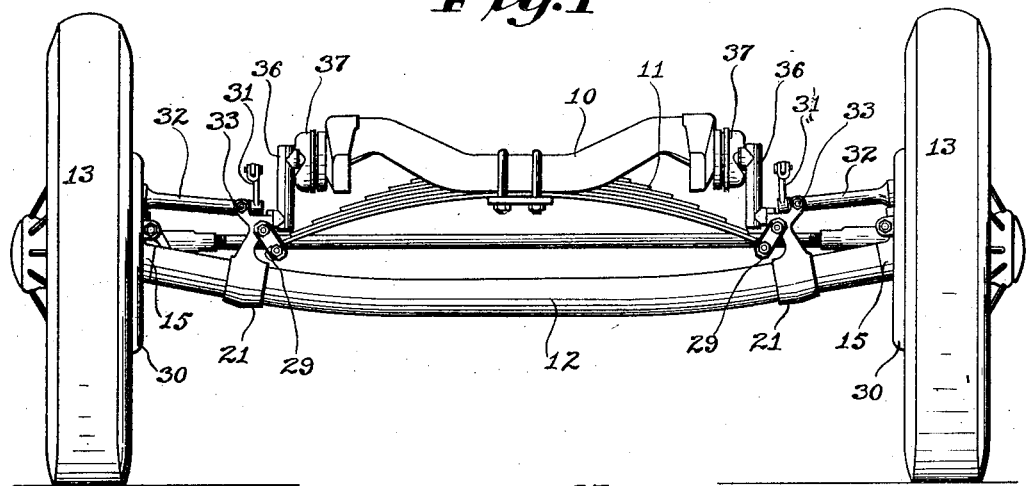
Figure 1 shows a front elevation of an automobile chassis having my improved axle installed thereon.
Figure 2:
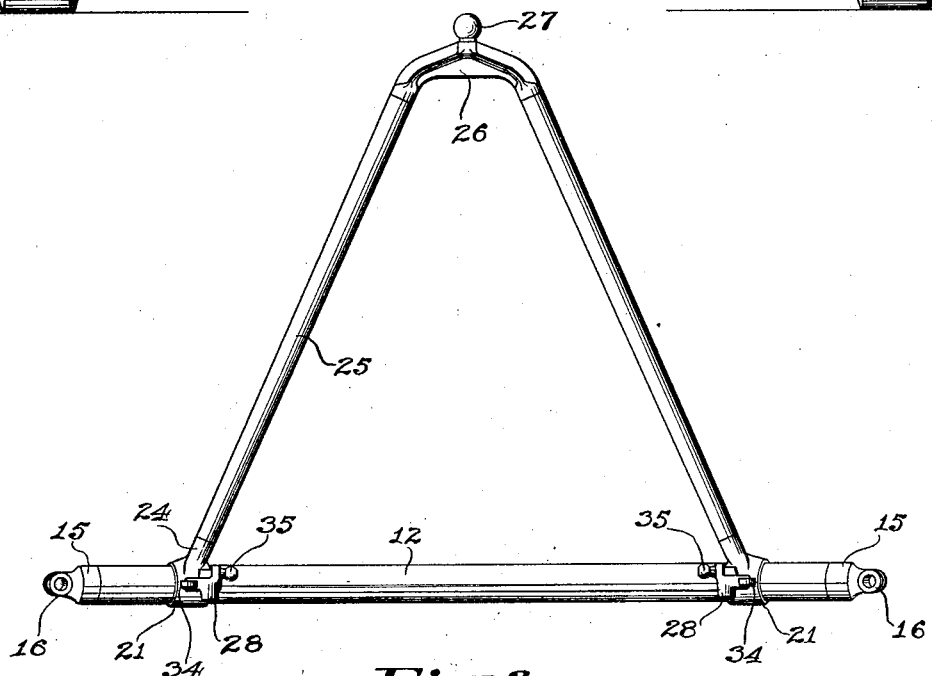
Figure 2 shows a plan view of the axle and radius rod structure, shown in Figure 1.

Referring to the accompanying drawings, I have used the reference numeral 10 to indicate generally the front cross member of an automobile chassis frame. A transverse front spring 11 is secured to this cross member, the ends of the spring extending outwardly where they are secured to my improved front axle. This axle in general consists of a tubular member 12 which extends transversely beneath the spring 11 and terminates adjacent to the axes of a pair of front wheels 13. These front wheels are each provided with brakes 30 acting through suitable brake drums.

The front wheels of the car must be arranged to swivel around the ends of the axle 12 and I have, therefore, provided a knuckle joint at each end of the tube 12. These knuckle joints consists of forging 15 each having a head 16 with an opening therein adapted to receive a vertical king pin around which the respective wheel 13 pivots. These forgings are also each provided with a pair of spaced turned pilots 17 and 19 which project into the respective ends of the tube 12. A channel shaped portion 18 joins the pilots 17 and 19, the head 16, pilots 17 and 19, and portions 18 being formed integrally as the forging 15. These forgings are inserted in the ends of the tube 12 so that only the heads 16 project therefrom thus reinforcing the ends of the tube.

The outer ends of the tube 12 are provided with longitudinal slots 14 preferably machined in the tube along the abutting edges of the sheet from which the tube is formed and a key 20 formed integrally therewith projects from the lower portion of each extension 18 and coacts with the adjacent slot 14 to prevent relative rotation between the tube and forging. Thus, the knuckles are firmly secured against rotation in the ends of the tube and also reinforce these ends against bending strains.

I have provided a pair of radius rod sleeves 21 which are adapted to be secured over the tube 12 in positions spaced from the knuckles 16 and directly over the inner pilots 19. Each sleeve member 21 is provided with a slot 22 which is aligned with the inner end of the respective slot 14. A projection extends from the inner end of each key 20, of somewhat greater height than the rest of the key, as illustrated at 23, so that this portion of the key may extend not only through the slot 14 but also into the slot 22 in the sleeve 21. It will thus be seen that each sleeve 21 and knuckle head 16 is prevented against relative rotation independently of the tube 12.

The sleeves 21 are provided with oval shaped bosses 24 which extend rearwardly from the center portions thereof. A tubular radius rod 25 is butt-welded to each of these sections 24, which radius rods extend diagonally rearwardly and have their rear ends butt-welded to a cross beam 26. This beam is provided with a ball member 27 formed integrally therewith through which it is universally connected to the under side of the vehicle engine. From the foregoing, it may be seen that the torsional loads originating in the front wheel brakes are transmitted through the knuckles 16, channel portions 18, keys 23 and sleeves 21 to the radius rods 25 and ball 27 where these loads are absorbed in the vehicle engine.

Referring to Figure 5, I have shown by hatched lines 38 the abutting edges of the structure which I prefer to weld into a unitary structure. This welding is preferably accomplished by arc or pencil welding so that in the completed axle the keys 20 and 23 together with the tube seam and slots and slotted portion of the sleeves 21 will form a unitary member. However, it will be readily seen that the torisonal loads of the brakes are transmitted from the knuckles to the radius rods independently of these welds so that the welds are not subject to major strains. These welds, although adding considerable rigidity to the structure are primarily designed to provide a simple, inexpensive and permanent method of securing the parts together.

A spring perch 28 is formed integrally with each sleeve 21 projecting upwardly and inwardly from the ends of the axle. Each perch is provided with openings to receive a spring shackle 29 which is pivotally secured to the respective outer end of the spring 11. Thus, the weight of the car is supported through the spring 11, shackles 29, spring perches 28, the outer ends of the tube 12, the knuckle joints 16 and wheels 13.

Each of the brakes 30 is provided with an operating mechanism 31 which extends through a tubular housing 32 from a position adjacent to the brake to a position directly over the adjacent spring perch 28. The outer end of each housing 32 is secured to the axle king pin while the inner end thereof is fastened by a bolt 33 to an ear 34 which is formed integrally with the adjacent spring perch and projects upwardly therefrom. Thus, an integral ear is formed on each spring perch which supports the inner ends of the brake operating mechanism housings.

In like manner, I have provided a ball 35 which extends inwardly from the upper end of each spring perch 28 and which for convenience in manufacture, is machined separately and later secured to the perch. These ball members 35 secure the lower ends of shock absorber ball joint connections 36 to the axle. The upper ends of these connections 36 are secured to the outer ends of arms extending from suitable shock absorbers 37, which are secured to the chassis frame. It will thus be seen that the simple installation of the sleeve members 21 on the axle 12 provides a mounting for the radius rods, front springs, brake operating mechanism housings, and shock absorber connections. No brackets, openings or other attachments are required in the axle to secure these essential parts thereof.

Among the many advantages of the structure shown it should be stated that the pilots 19 not only serve to guide the inner ends of the forgings 15 thereby securing proper alignment between the heads 16 and sleeves 21 but further reinforce those portions of the tube adjacent to the sleeves so that the tendency to buckle the tube at these points, due to the weight of the car and impact loads received on the wheels, is thereby prevented.

It will also be noted that this structure is economical to produce as only very ordinary machine operations are required in finishing the forgings 15. These operations consist of drilling the king pin openings, turning the pilots 17 and 19 and milling the keys 20. Likewise, to machine the sleeves 21 it is only necessary to bore the openings for the ends of the axle and then mill the slots 22 therein.

Further, it will be noted that the welded seams in the device are not subject to major strains as they are provided mainly to prevent disassembling of the structure.

A still further advantage in connection with this structure arises because the spring perches, knuckles, radius rods and axle can only be assembled in perfect alignment thereby making it unnecessary to provide expensive fixtures and the like for holding these parts in alignment while being welded.

However, the main advantage in connection with my improved device arises because the braking torque of the front wheels is transmitted from the knuckle joints directly to the radius rods without being transmitted through the tubular axle. Because of this, I am able to utilize a tube of much smaller section than would otherwise be possible to thereby decrease the unsprung weight of the car.

Some changes may be made in the arrangement, construction and combination of the various parts of my improved device without departing from the spirit of my invention, and it is my intention to cover by my claims, such changes as may reasonably be included within the scope thereof.

I claim as my invention:

1. In a tubular front axle, a knuckle joint having an integral channel section portion projecting into the end of said tube, a sleeve secured over said axle in position spaced from said knuckle joint, a pilot secured on the end of said channel portion extending into said tube to reinforce the tube adjacent to said sleeve, and means formed integrally with said channel member extending through the walls of said tube and sleeve so as to interlock with said sleeve to thereby transmit the torsional loads from the knuckle to the sleeve independently of said axle.

2. A front axle comprising, an open ended tube having a longitudinal slot in each end thereof, knuckle joints having portions adapted to extend into the ends of said tube having keys thereon projecting into said slots, and sleeves adapted to be secured over said tube in positions spaced from said knuckle joints, said sleeves having slots therein receiving said knuckle joint keys to thereby absorb the torsional loads from the knuckle joints independently of said tube.

3. A tubular front axle comprising, an open ended tube, knuckle joints having portions inserted in each end of said tube, a pair of sleeves secured over said tube spaced inwardly from said knuckle joints, means extending from the inserted ends of said knuckles through said tube and into said sleeves, and a pair of radius rods integrally united with said sleeves so that the torsional loads from said knuckles may be transmitted to said radius rods independently of the tubular portion of the axle.

HENRY FORD.